United States Patent
Haramaty et al.

(10) Patent No.: US 12,353,349 B2
(45) Date of Patent: Jul. 8, 2025

(54) HOT TRANSITION OF I2C TO I3C

(71) Applicant: MELLANOX TECHNOLOGIES, LTD., Yokneam (IL)

(72) Inventors: Zachy Haramaty, Hemed (IL); Yehezkel Rothbaum, Lod (IL); Amit Solomon, Kiryat Ono (IL); Shahar Givony, Tel Aviv (IL); Aviv Hasson, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 58 days.

(21) Appl. No.: 18/176,089

(22) Filed: Feb. 28, 2023

(65) Prior Publication Data

US 2024/0289297 A1 Aug. 29, 2024

(51) Int. Cl.
*G06F 13/42* (2006.01)

(52) U.S. Cl.
CPC .. *G06F 13/4282* (2013.01); *G06F 2213/0016* (2013.01)

(58) Field of Classification Search
CPC ............ G06F 13/4282; G06F 2213/0016
See application file for complete search history.

(56) References Cited

U.S. PATENT DOCUMENTS

| | | | | |
|---|---|---|---|---|
| 2011/0302344 A1* | 12/2011 | Bell | ............. | G06F 13/4291 710/110 |
| 2015/0281871 A1* | 10/2015 | Poulsen | ............. | H04W 4/70 370/328 |
| 2015/0378959 A1* | 12/2015 | Jones | ............. | G06F 3/061 710/110 |
| 2017/0261592 A1* | 9/2017 | Min | ............. | G01S 5/0264 |
| 2017/0286358 A1* | 10/2017 | Srivastava | ............. | G06F 13/1673 |
| 2019/0108149 A1* | 4/2019 | Graif | ............. | G06F 13/4291 |
| 2020/0128077 A1* | 4/2020 | Yu | ............. | H04L 69/18 |
| 2022/0070058 A1* | 3/2022 | Lee | ............. | H04L 41/0806 |
| 2022/0083483 A1* | 3/2022 | Mishra | ............. | G06F 13/4282 |

OTHER PUBLICATIONS

"I2C-bus specification and user manual," NXP B.V., Oct. 2021, Rev. 7.0, 62 pages.
"Specification for I3CSM: Improved Inter Integrated Circuit," MIPI Alliance, Inc., Dec. 2016, Version 1.0, 197 pages.

* cited by examiner

*Primary Examiner* — Henry Tsai
*Assistant Examiner* — Harry Z Wang
(74) *Attorney, Agent, or Firm* — Sheridan Ross P.C.

(57) ABSTRACT

A system includes a communication bus, a controller device, and a target device. The controller device and the target device may transition between different communication protocols in association with transferring data over the communication bus. The target device may receive a transaction command including a slave address. Based on the slave address, the target device may determine a communication protocol associated with transferring data in association with the transaction command. A first communication protocol may include a message protocol, and the message protocol may be associated with an I2C communication protocol or an I3C communication protocol. The second communication protocol may include a bus protocol, and the bus protocol may be associated with the I2C communication protocol.

21 Claims, 6 Drawing Sheets

HOT TRANSITION OF I2C TO I3C

FIELD OF TECHNOLOGY

The present disclosure relates to bus communications between devices, and more particularly, bus communications utilizing "inter integrated circuit" (I2C) and "improved inter integrated circuit" (I3C) communication standards.

BACKGROUND

Some integrated circuits support communication utilizing I2C and I3C communication standards. Techniques for improving communication using I2C and I3C communication standards are desired.

SUMMARY

The described techniques relate to improved methods, systems, devices, and apparatuses that support hot transition between I2C and I3C.

Examples may include one of the following features, or any combination thereof.

An apparatus including electronic circuitry. The electronic circuitry is to: receive a transaction command including a slave address; determine, based on the slave address, a communication protocol associated with transferring data in association with the transaction command over a communication bus; and transfer the data in association with the transaction command based on the communication protocol.

In some aspects, determining the communication protocol includes identifying a first communication protocol or a second communication protocol as the communication protocol based on a result of comparing the slave address to a second slave address.

In some aspects, the transaction command further includes: a first indication of a message interface associated with the slave address; or a second indication of direct register access associated with the slave address. In some aspects, determining the communication protocol includes: identifying the first communication protocol as the communication protocol in response to the transaction command including the first indication; and identifying the second communication protocol as the communication protocol in response to the transaction command including the second indication.

In some aspects, the first communication protocol includes a message protocol, wherein the message protocol is associated with an I2C communication protocol or an I3C communication protocol. In some aspects, the second communication protocol includes a bus protocol, wherein the bus protocol is associated with the I2C communication protocol.

In some aspects, in response to a comparison result in which the slave address fails to match the second slave address, the electronic circuitry is to: compare the slave address to a set of slave addresses included in an address table, wherein the set of slave addresses include one or more slave addresses associated with an I2C communication protocol, one or more second slave addresses associated with an I3C communication protocol, or a combination thereof; identify a memory corresponding to the slave address, based on comparing the slave address to the set of slave addresses included in the address table, wherein the memory is of a device; and transfer the data to or from the memory of the device in association with the transaction command, using the first communication protocol, wherein the first communication protocol includes the I2C communication protocol or the I3C communication protocol.

In some aspects, in response to a comparison result in which the slave address matches the second slave address, the electronic circuitry is to: identify a hardware register corresponding to the slave address; and transfer the data to or from the hardware register in association with the transaction command, using the second communication protocol, wherein the second communication protocol includes the I2C communication protocol.

In some aspects, in response to a comparison result in which the slave address fails to match the second slave address, the electronic circuitry is to compare the slave address to a set of slave addresses included in an address table. In some aspects, the address table is compatible with identifying one or more target devices in association with: using the first communication protocol in association with an I3C communication protocol and the one or more target devices; using the first communication protocol in association with an I2C communication protocol and the one or more target devices; and using the second communication protocol in association with the I2C communication protocol and the one or more target devices.

In some aspects, in response to a comparison result in which the slave address fails to match the second slave address, the electronic circuitry is to: compare the slave address to a set of slave addresses included in an address table; and in response to identifying the slave address is absent from the set of slave addresses, ignore the transaction command.

In some aspects, the electronic circuitry is to receive a second transaction command, wherein the second transaction command is a dummy command, wherein a message payload of the dummy command includes a null command.

In some aspects, the electronic circuitry is to identify, as the communication protocol, an I3C communication protocol in response to receiving the second transaction command.

An apparatus including electronic circuitry. The electronic circuitry is to: determine a communication protocol associated with exchanging data over a communication bus; generate, in response to determining the communication protocol, a transaction command including a slave address; and exchange the data with a target device corresponding to the slave address using the communication protocol, based on transmitting the transaction command.

In some aspects, determining the communication protocol includes setting an I3C communication protocol as the communication protocol based on one or more criteria. In some aspects, the one or more criteria includes at least one of: a target performance threshold; and an absence or presence of the data to be exchanged with the target device.

In some aspects, determining the communication protocol includes setting an I2C communication protocol as the communication protocol based on one or more criteria, wherein the communication protocol includes a bus protocol. In some aspects, the one or more criteria includes at least one of: an error associated with reading the data using a previous communication protocol; a security parameter associated with requesting the data; and a target use of the bus protocol in association with reading registers of the target device.

In some aspects, determining the communication protocol includes setting an I2C communication protocol or an I3C communication protocol as the communication protocol, wherein the communication protocol includes a message protocol. In some aspects, the electronic circuitry is to select the slave address from a set of slave addresses included in an address table in response to setting the I2C communication protocol or the I3C communication protocol as the communication protocol.

In some aspects, the address table is compatible with identifying one or more target devices in association with using the I2C communication protocol and the I3C communication protocol.

In some aspects, determining the communication protocol includes setting an I3C communication protocol as the communication protocol. In some aspects, the electronic circuitry is to transmit a second transaction command in response to setting the I3C communication protocol as the communication protocol, wherein the second transaction command is a dummy command.

A system including: a communication bus; a controller device; and a target device. In some aspects, the controller device and the target device transition between using a first communication protocol comprising a message protocol and a second communication protocol comprising a bus protocol in association with transferring data over the communication bus based on a transaction command generated by the controller device.

In some aspects, the controller device and the target device transition between using the first communication protocol and the second communication protocol without: a reset protocol between the controller device and the target device; a handshake protocol between the controller device and the target device; a waiting period between using the first communication protocol and the second communication protocol; or an indication of the first communication protocol or the second communication protocol.

In some aspects, based on the transaction command, the controller device and the target device transition between: using an I2C communication protocol in association with the first communication protocol; using an I3C communication protocol in association with the first communication protocol; and using the I2C communication protocol in association with the second communication protocol.

In some aspects, based on a slave address included in the transaction command, the target device uses the first communication protocol or the second communication protocol in association with transferring the data over the communication bus.

In some aspects, the system further includes an address register including a set of slave addresses. In some aspects, the target device, based on a result of comparing the slave address included in the transaction command to the set of slave addresses: transfers the data over the communication bus to or from a memory of a device, wherein the device is associated with the slave address; or ignores the transaction command.

A method including: receiving a transaction command including a slave address; determining, based on the slave address, a communication protocol associated with transferring data in association with the transaction command over a communication bus; and transferring the data in association with the transaction command based on the communication protocol.

In some aspects, determining the communication protocol includes: identifying a first communication protocol or a second communication protocol as the communication protocol based on a result of comparing the slave address to a second slave address.

A method including: determining a communication protocol associated with exchanging data over a communication bus; generating, in response to determining the communication protocol, a transaction command including a slave address; and exchanging the data with a target device corresponding to the slave address using the communication protocol, based on transmitting the transaction command.

In some aspects, determining the communication protocol includes: setting an I3C communication protocol as the communication protocol based on one or more criteria. In some aspects, the one or more criteria includes at least one of: a target performance threshold; and an absence or presence of the data to be exchanged with the target device.

DETAILED DESCRIPTION

Figure 1:
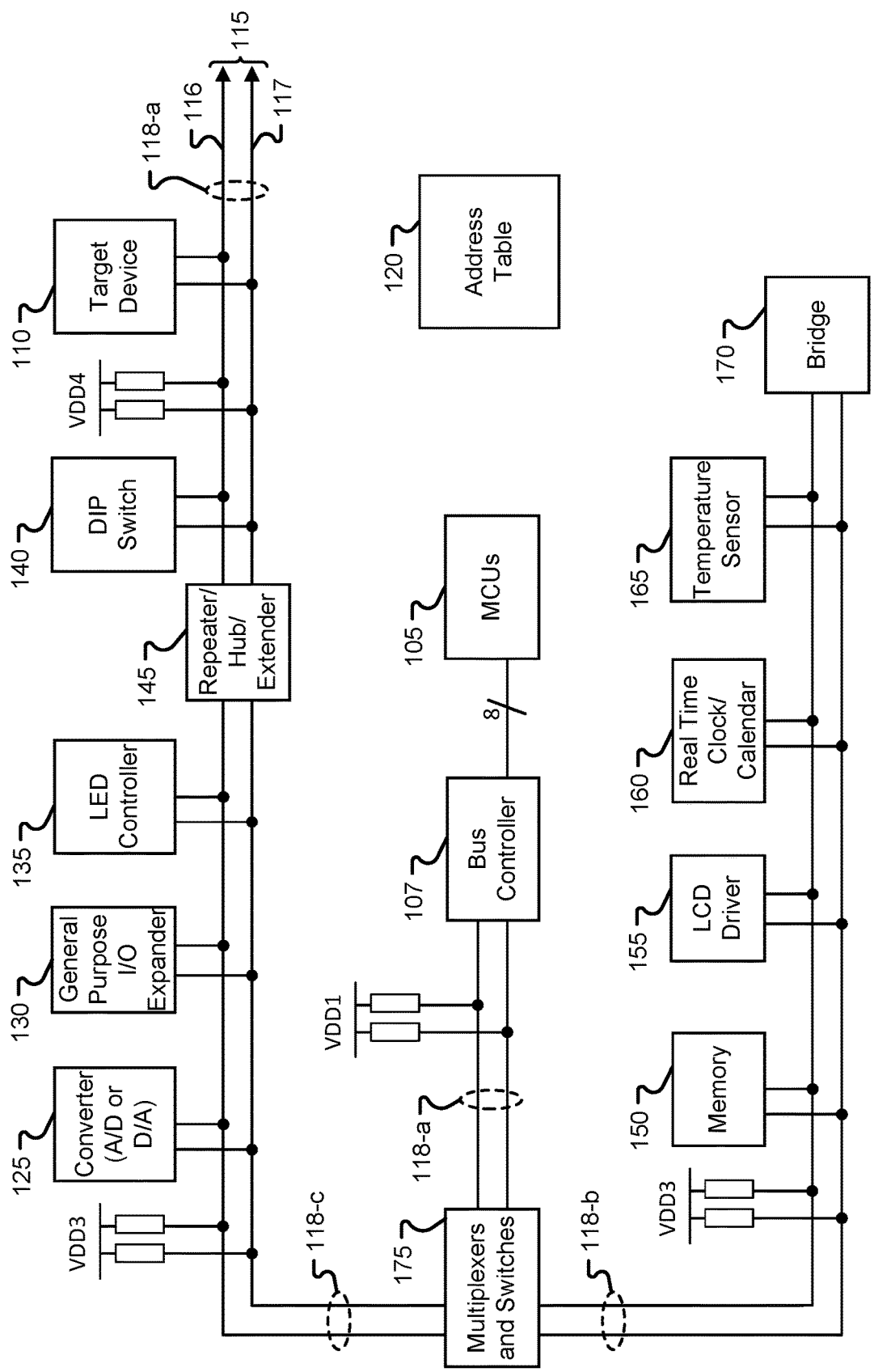
FIG. 1 illustrates an example of a system in accordance with aspects of the present disclosure.

The ensuing description provides example aspects of the present disclosure, and is not intended to limit the scope, applicability, or configuration of the claims. Rather, the ensuing description will provide those skilled in the art with an enabling description for implementing the described examples. It being understood that various changes may be made in the function and arrangement of elements without departing from the spirit and scope of the appended claims. Various aspects of the present disclosure will be described herein with reference to drawings that are schematic illustrations of idealized configurations.

Some integrated circuits support communication utilizing I2C and I3C communication standards. I2C supports direct hardware (HW) reading of registers (e.g., ASIC registers) and bus speeds of up to 1 MHz. I2C communication over a communication bus may support serial, 8-bit oriented, bidirectional data transfers at up to 100 kbit/s in Standard-mode, up to 400 kbit/s in Fast-mode, up to 1 Mbit/s in Fast-mode Plus, or up to 3.4 Mbit/s in High-speed mode. I2C communication over the communication bus may support serial, 8-bit oriented, unidirectional data transfers up to 5 Mbit/s in Ultra Fast-mode.

I3C (also referred to herein as mobile industry processor interface (MIPI) I3C) provides a scalable, medium-speed, utility and control bus for connecting peripherals to an application processor. The design of I3C incorporates attributes from both I2C-bus and serial peripheral interfaces (SPI interfaces) to provide a unified, high-performance, low-power interface solution that delivers a flexible upgrade path for I2C-bus and SPI implementers.

I3C supports a multi-drop bus that, at 12.5 MHz, supports standard data rate (SDR) of 12.5 Mbps with options for high-data-rate (HDR) modes. The net result is that I3C offers increases in performance and power efficiency compared with I2C. I3C works with firmware (rather than supporting direct hardware reading as with I2C), and I3C benefits from the higher bus speed of 12.5 Mhz. Although the I3C specification standards generally describe that I3C may support backward compatibility with I2C while providing increased speed and low power consumption, techniques for how to transition from I2C to I3C and from I3C to I2C are desired. Techniques for improving communication using I2C and I3C are desired.

The terms "I2C," "I2C bus," "I2C mode," "I2C communication mode," "I2C communication protocol," "I2C communications," and "I2C bus communications" may be used interchangeably herein. The terms "I3C," "I3C bus," "I3C mode," "I3C communication mode," "I3C communication protocol," "I3C communications," and "I3C bus communications" may be used interchangeably herein.

Similar to I2C, I3C is implemented with standard CMOS I/O pins using a two-wire interface. Different from I2C, I3C supports in-band interrupts enabling target devices to notify controllers of interrupts, a design feature that eliminates a separate general-purpose input/output (GPIO) interrupt for each target device. Such support for in-band interrupts provides reduced system cost and complexity. Support for dynamic address assignments minimizes pin counts, thereby accommodating space-constrained form factors.

I3C has been designed to be backward compatible with I2C devices. The backward compatibility supports the connection of a mix of I2C and I3C devices on the same communication bus. In some cases, I2C devices electrically coupled to the communication bus may be equipped with 50 ns spike filters.

The I3C communication protocol defines a discovery mechanism, Dynamic Address Assignment (DAA), for automatically discovering devices present on the communication bus and for automatically discovering capabilities and functionalities provided by the discovered devices. DAA both discovers devices and assigns dynamic addresses to the devices. In contrast, I2C devices present on the communication bus are unable to be discovered using DAA. A controller device identifies the I2C devices and device capabilities (e.g., functionalities, bus related performance abilities, etc.) of the I2C devices based on static declarations associated with the I2C devices.

According to example aspects of the present disclosure, techniques described herein support accessing both I2C and I3C communication protocols interchangeably. Aspects of the present disclosure support using the I2C communication protocol or the I3C communication protocol as a message protocol. Additionally, or alternatively, aspects of the present disclosure support using the I2C communication protocol as a register access protocol (also referred to herein as a "bus protocol"). A system may include controller devices (also referred to herein as "masters," "master devices," or "initiators") and target devices (also referred to herein as "targets" or "slave devices"), and the slave devices may include a combination of I2C target devices and I3C target devices. The system may support a hybrid use of I2C and I3C.

In some aspects, the controller device may switch to using I2C based on a set of criteria. For example, the controller device may switch to using I2C for ease of debugging, for cases of writing/reading direct HW, for cases in which writing data to/reading data from firmware is not needed, and the like, while trading off for reduced performance (e.g., slower bus speeds) associated with I2C.

Example aspects of the present disclosure described herein support a hybrid implementation of I2C and I3C. In some aspects, the hybrid implementation provides technical advantages and improvements in bus communications that are switchable between I2C communications for writing and reading direct HW (e.g., for chicken-and-egg issues with HW-FW, when FW is stuck, security issues (e.g., requesting answer about device ID), etc.) and I3C communications for taking advantage of higher bus speeds.

According to some example implementations, a controller device and a target device may transition between different protocols without requiring a reset protocol, a handshake protocol, or a wait time between the controller device and the target device. Example aspects of transitioning between different protocols may include, without limitation, transitioning between using the I2C communication protocol and the I3C communication protocol, transitioning between using a message protocol (e.g., using I2C communication protocol or I3C communication protocol) and a register access protocol (e.g., using I2C communication protocol), and transitioning between using I2C communication protocol or I3C communication protocol as the message protocol.

For example, the controller device and the target device may transition between using the message protocol (e.g., using I2C communication protocol or I3C communication protocol) and the register access protocol (e.g., using I2C communication protocol) without requiring a reset protocol, a handshake protocol, or a wait time. The controller device and the target device may transition between using the I2C communication protocol and the I3C communication protocol without requiring a reset protocol, a handshake protocol, or a wait time. The wait time may be a waiting period or temporal duration between using a first communication protocol (e.g., message protocol using I3C, message protocol using I2C, register access protocol using I2C, etc.) and a second communication protocol (e.g., a different protocol among the message protocol using I3C, message protocol using I2C, register access protocol using I2C, etc.) in association with the transition.

In some aspects, a controller device and a target device may transition between different protocols described herein without a priory agreement on the state of I2C or I3C. For example, the controller device and the target device may transition between using the I3C communication protocol and the I2C communication protocol without an indication of the I3C communication protocol or the I2C communication protocol. In some aspects, the controller device may provide the slave address to the target device, based on which the target device may identify the communication protocol (e.g., message protocol, register access protocol, I2C communication protocol, I3C communication protocol, etc.). Accordingly, for example, the target device may adapt to the communication protocol as set by the controller device.

In some examples, the controller device and the target device may transition between communication protocols (e.g., message protocol, register access protocol, I2C communication protocol, I3C communication protocol, etc.) based on an address table agreed on a priory between the controller device and the target device. For example, the target device may compare slave addresses provided by the controller device to a set of slave addresses included in the address table. Based on a result of the comparison, the target device may identify a communication protocol (e.g., message protocol, register access protocol, I2C communication protocol, I3C communication protocol, etc.) for exchanging data with the controller device.

According to example aspects of the present disclosure, using I2C may support direct hardware reading even if a device was working in I3C mode. For example, using I2C may support direct hardware reading even if a device was working in I3C mode and firmware is stuck. In some aspects, as described herein with respect to using I3C may support switching between using an open-drain mode (e.g., for compatibility) and a push-pull mode (e.g., push-pull outputs) based on one or more criteria. For example, the controller device and/or target device may move from push-pull to open drain in association with transitioning to using I2C. In another example, the controller device and/or target device may, by default, move to push-pull in order to save power.

In another example, if the controller device has "nothing to say" (e.g., the controller device does not intend to transfer or read data from a memory of the target device), the controller device may operate in I3C and provide a dummy command to the target device. For example, the controller device may remain operating in I3C by default, or alternatively, transition from operating in I2C to I3C. In an example, the dummy command may be absent a slave address. In another example, a message payload of the dummy command may include a null command.

In response to receiving the dummy command, the target device may operate using I3C. For example, based on identifying that the dummy command is absent a slave address or identifying the message payload includes a null command, the target device may operate using I3C (e.g., remain operating in I3C, transition to I3C, etc.). In some aspects, operating in I3C may support using in-band interrupts. Transmitting/receiving in-band interrupts using an I3C bus may reduce overhead that would otherwise be incurred if using a separate interrupt wire for transmitting/receiving interrupts.

Aspects of the I2C communication protocol, the I3C communication protocol, and operations thereof are described in more detail in publicly available documents; see, e.g. "UM10204 I2C-bus specification and user manual", Rev. 7.0; 1 Oct. 2021, NXP Semiconductors, which is incorporated by reference herein.

Aspects of the disclosure are further illustrated by and described with reference to apparatus diagrams, system diagrams, and flowcharts that relate to hot transition between I2C and I3C.

FIG. 1 illustrates an example of system 100 that supports hot transition between I2C and I3C in accordance with aspects of the present disclosure.

The system 100 may be a printed circuit board (PCB) that includes one or more microcontroller devices 105 (e.g., ARM, MIPS, DSP (digital signal processor) processor, etc.) and one or more peripheral devices. The peripheral devices may include, for example, a target device 110, analog-to-digital (A/D) or digital-to-analog (D/A) converters 125, general purpose input/output (I/O) expanders 130, light emitting diode (LED) controllers 135, switches 140 (e.g., dual in-line package (DIP) switches), liquid crystal display (LCD) drivers 155, a real time clock/calendar 160, and temperature sensors 165, but are not limited thereto. One or more memory devices 150 (e.g., an electrically erasable programmable read only memory (EEPROM), etc.) and one or more of the peripheral devices may be coupled to MCUs 105 by a serial connection via a communication bus 115.

The communication bus 115 may be an I3C communication bus electrically coupled with I3C compatible devices (e.g., devices that support the I3C communication protocol) and I2C compatible devices (e.g., devices that support the I2C communication protocol). For example, one or more of the peripheral devices may support I3C communication protocol, and one or more of the peripheral devices may support I2C communication protocol. The communication bus 115 may support the I2C communication protocol and I3C communication protocol. The communication bus 115 includes two bus lines (also referred to herein as signal pins): a serial data line (SDA) 116 and a serial clock line (SCL) 117.

The I3C communication protocol uses the same two bus lines (e.g., SDA 116 and SCL 117) as the I2C communication protocol. The I2C communication protocol operates the signal pins SDA 116 and SCL 117 as open-drain outputs at all time, and resultant speeds associated with the open-drain setting are limited by the resultant slow signal rise time. The I3C communication protocol uses open-drain mode for compatibility (e.g., with I2C devices), but switches to push-pull outputs whenever possible (e.g., when compatibility with I2C devices is not involved).

Bus controllers 107 may provide an interface between an MCU 105 and bus-compatible devices via the communication bus 115. According to example aspects of the present disclosure, some of the one or more peripheral devices (e.g., target device 110, A/D or D/A converters 125, general purpose I/O expanders 130, LED controllers 135, switches 140, LCD drivers 155, real time clock/calendar 160, temperature sensors 165, etc.) and/or some of the memory devices 150 (e.g., an EEPROM, etc.) may be compatible with I3C communication protocol and I2C communication protocol over the communication bus 115. In some aspects, some of the one or more peripheral devices and/or some of the memory devices may be compatible with only I2C communication protocol over the communication bus 115. As described herein, I3C may support backward compatibility with I2C while providing increased speed and low power consumption.

In the example of FIG. 1, the communication bus 115 may be a single segment or divided into several segments (e.g., segment 118-a through segment 118-d). For example, the communication bus 115 may be divided into by one or more repeaters 145 (also referred to herein as hubs or extenders), one or more bridges 170, one or more splitters, one or more multiplexers 175 (also referred to herein as "multiplexers and switches"), etc.

The communication bus 115 may be electrically coupled to devices (e.g., the peripheral devices) on a printed circuit board (PCB). For example, the communication bus 115 may be electrically coupled to devices on multiple ICs mounted on a rigid PCB, a flexible PCB, or another type of substrate. Additionally, or alternatively, the communication bus 115 may be electrically coupled to devices on multiple ICs packaged in a multiple chip module (MCM), stacked in a system-in-package (SiP), or the like. The system 100 may be implemented as multiple ICs mounted on a PCB (or other type of substrate), multiple ICs packaged in a MCM, multiple ICs stacked in a SiP, or the like.

In some cases, the segments 118 may operate using the same pull-up voltage VDD. Additionally, or alternatively, one or more of the segments 118 may operate using different pull-up voltages VDD. For example, pull-up voltage VDD1 through pull-up voltage VDD4 may support the technologies respectively used by devices connected to the respective segments 118. In an example, pull-up voltage VDD1 may support technologies used by MCUs 105, bus controllers 107, and/or multiplexers 175. In another example, pull-up voltage VDD2 may support technologies used by LED controllers 135, switches 140, LCD drivers 155, memory devices 150 (e.g., an EEPROM, etc.), real time clock/calendar 160, temperature sensors 165, and/or bridges 170.

The system 100 may support a single master or multiple masters on a common communication bus (e.g., communication bus 115). Each device connected to the communication bus 115 is software addressable by a unique address. For example, each device (e.g., an MCU 105, a target device 110, an A/D or D/A converter 125, a general purpose I/O expander 130, microcontroller, an LED controller 135, etc.) is recognizable by an address unique to the device. Each device can operate as either a transmitter or receiver in association with a function of the device. For example, an LCD driver 155 may be capable of operating as a receiver, whereas a memory device 150 can both receive and transmit data. Controllers (e.g., a MCU 105, etc.) may operate as controller-transmitters or as controller-receivers.

The address table 120 may be an address register including a set of slave addresses. Example aspects of the address table 120 are described with reference to FIGS. 2 and 3. The terms "address table," "address register," "slave address table," "target address table," and "target device address table" may be used interchangeably herein.

The address table 120 may support address resolution protocol (ARP). Aspects of the address table 120 support adding fields that correspond to device capability of the devices (e.g., support of I2C and/or I3C). Aspects of the system 100 support adding a new command "Assign_Address_I3C," which is similar to the existing "Assign Address" command associated with ARP. Example aspects of ARP are described in more detail in publicly available documents; see chapter 6.5 of System Management Bus (SMBus) Specification, Version 3.1, 19 Mar. 2018, System Management Interface Forum, Inc., which is incorporated by reference herein.

Devices (e.g., an MCU 105, an A/D or D/A converter 125, a general purpose I/O expander 130, microcontroller, an LED controller 135, etc.) connected to the communication bus 115 can be considered as controller devices or target devices when performing data transfers. For example, a controller device (also referred to herein as a "master") initiates a data transfer on the communication bus 115 and generates the clock signals to permit the transfer. The controller device drives the communication bus 115 and is in charge of initiating transactions or deciding which device is allowed to communicate data (e.g., "talk") on the communication bus 115 bus.

Any device addressed for the data transfer is a target device (also referred to herein as a "slave"). In some cases, a target device acts as a slave and is unable to send frames to another target device on the communication bus 115. The I3C protocol allows target devices to generate events (e.g., in-band interrupts (IBIs) for notifying controller devices of interrupts) without requiring an external signal, based on permissions by the controller device. The I3C communication protocol thereby allows the target devices to take temporary control of the bus.

I3C is a multi-master protocol. For example, multiple controller devices ("masters") may be coupled to the communication bus 115. The I3C communication protocol supports a single controller device acting as a master (e.g., having bus ownership) at a given time. The communication bus 115 is a true multi-controller bus including collision detection and arbitration to prevent data corruption for cases in which two or more controller devices simultaneously initiate data transfer. The communication bus 115 may support I3C communication and backward compatibility with I2C communication protocol.

According to example aspects of the present disclosure, the term "transmitter" may refer to a device which sends data over the communication bus 115. The term "receiver" may refer to a device which receives data over the communication bus 115. The term "controller device" (also referred to herein as "master," "controller," or "initiator") may refer to a device which initiates a transfer, generates clock signals, and terminates a transfer. The term "target device" (or "target" or "slave device") may refer to a device addressed by the controller device. The term "multi-controller" may refer to aspects in which more than one controller device can attempt to control the bus 115 at the same time without corrupting messages by other controller devices. The term "arbitration" may refer to a procedure to ensure that, if two or more controller devices simultaneously attempt to control the communication bus 115, only one controller is allowed to do so and the winning message (e.g., the message associated with the controller device that is allowed to control the communication bus 115) is not corrupted. The term "synchronization" may refer to a procedure to synchronize the clock signals of two or more devices.

Figure 2:
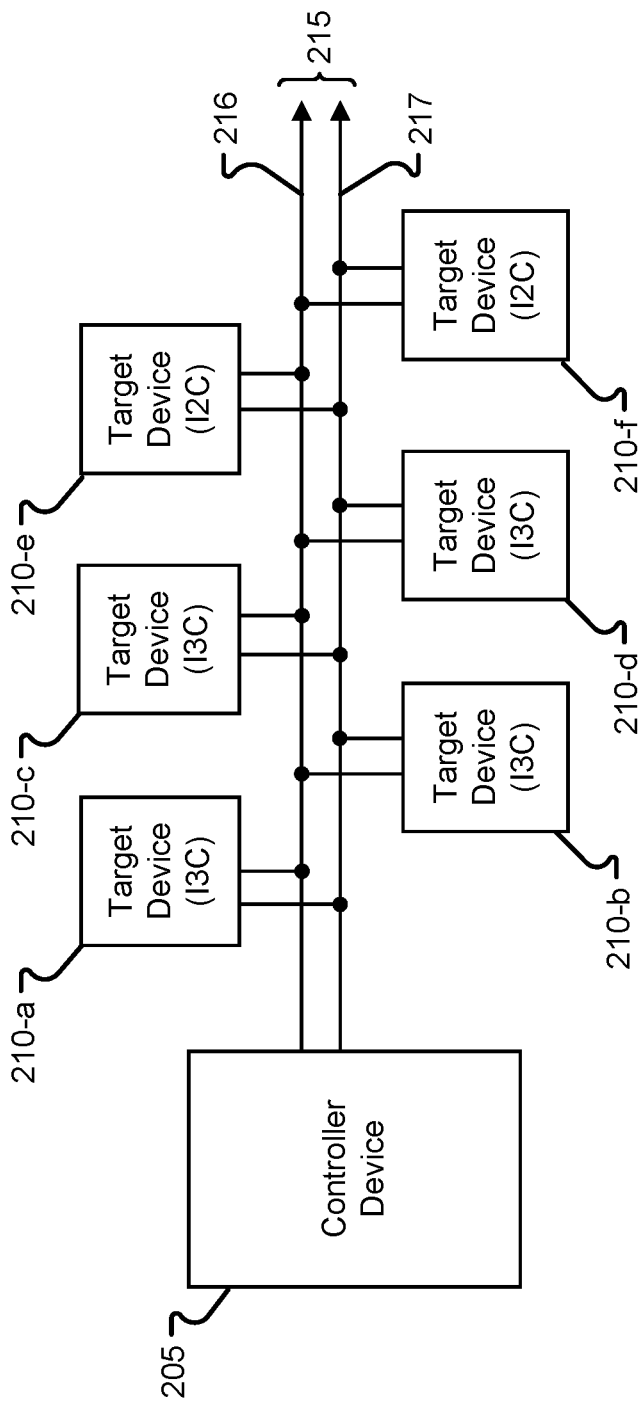
FIG. 2 illustrates an example of a system in accordance with aspects of the present disclosure.

FIG. 2 illustrates an example system 200 in accordance with aspects of the present disclosure. The system 200 may implement similar or identical aspects of the system 100 described with reference to FIG. 1.

For example, the system 200 may include a controller device 205 and target devices 210 (e.g., target device 210-a through target device 210-f) electrically coupled by a communication bus 215.

The controller device 205 may implement similar or identical aspects of a controller device (e.g., master) described with reference to FIG. 1. For example, the controller device 205 may be implemented by any device (e.g., an MCU 105, an A/D or D/A converter 125, a general purpose I/O expander 130, microcontroller, an LED controller 135, etc.) described with reference to FIG. 1. The controller device 205 may be implemented on a SoC. The controller device 205 may be connected to the communication bus 215, initiate a data transfer on the communication bus 215, and generate the clock signals to permit the transfer. The controller device 205 may transfer data and control information between the controller device 205 and various target devices 210 of the system 200.

The target devices 210 may implement similar or identical aspects of a target device (e.g., slave) described with reference to FIG. 1. For example, the target devices 210 may be implemented by any device (e.g., an MCU 105, a target device 110, an A/D or D/A converter 125, a general purpose I/O expander 130, microcontroller, an LED controller 135, etc.) described with reference to FIG. 1 that is addressed by the controller device 205 for the data transfer.

In some aspects, target device 210-a through target device 210-d may be I3C devices, compatible with I3C and I2C. For example, target device 210-a through target device 210-d may be I3C bus targets (or I2C bus targets). In some other aspects, target device 210-e and target device 210-f may be compatible only with I2C. For example, target device 210-e and target device 210-f may be I2C bus targets.

Accordingly, for example, I2C bus targets (e.g., target device 210-e) (with 50 ns filter) can coexist with I3C controllers (e.g., controller device 205) operating at I3C bus speeds (e.g., 12.5 MHz bus speeds). Such coexistence enables the migration of existing I2C-bus designs to the I3C specification. Conversely, I3C bus targets (e.g., target device 210-a) operating at I2C-bus speeds (e.g., 400 kHz, 1 MHZ, etc.) can coexist with existing I2C-bus controllers. I3C supports in-band interrupts that enable a target device 210 to notify the controller device 205 of interrupts.

Example aspects of the system 200 may include any quantity and any type of controller devices 205 (e.g., I3C controller devices, I2C controller devices) and target devices 210 (e.g., I3C target devices, I2C target devices). The system 200 may be standalone or may be included in the system 100 described with reference to FIG. 1.

In some aspects, the controller device 205 and one or more of the target devices 210 may transition between using an I3C communication protocol and an I2C communication protocol in association with transferring data over the communication bus 215 based on a transaction command generated by the controller device 205 and transmitted (by the controller device 205) over the communication bus 215.

Figure 3:
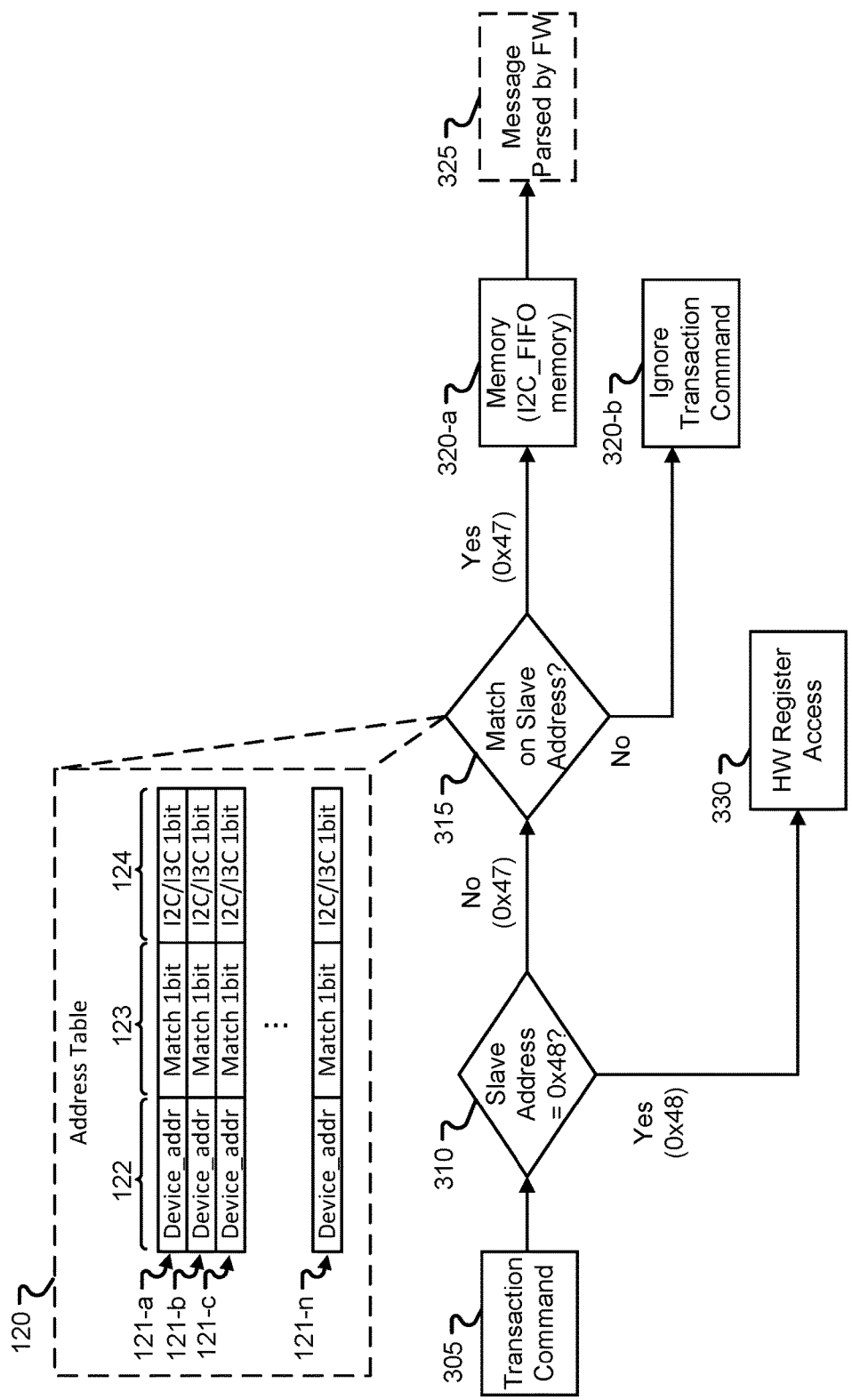
FIG. 3 illustrates an example block diagram in accordance with aspects of the present disclosure.
Figure 4:
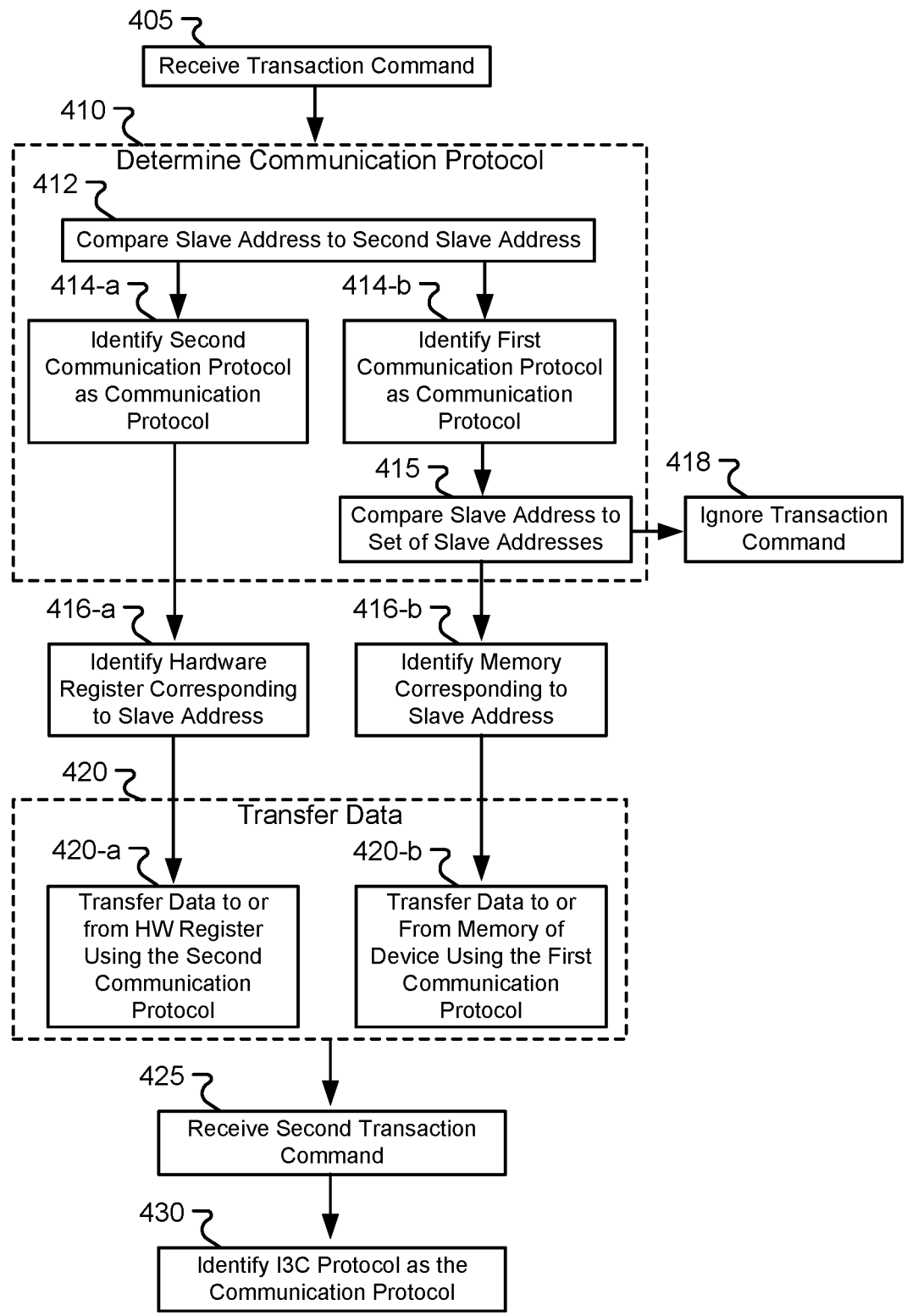
FIG. 4 illustrates an example of a process flow in accordance with aspects of the present disclosure.
Figure 5:
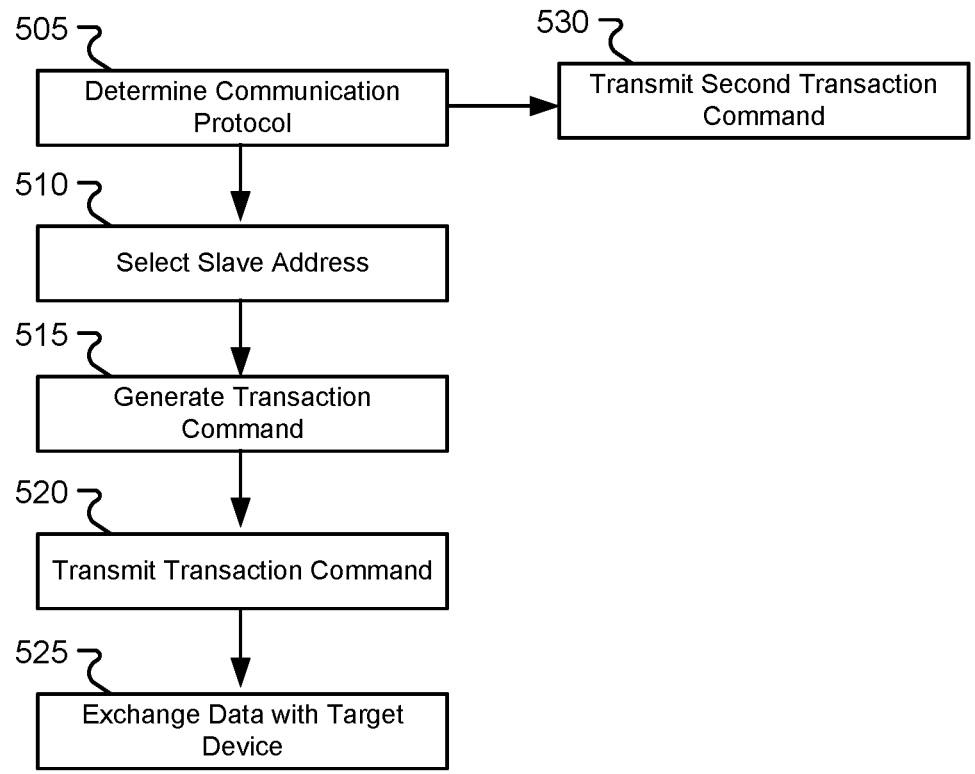
FIG. 5 illustrates an example of a process flow in accordance with aspects of the present disclosure.

Example aspects supportive of transitioning between using an I3C communication protocol and an I2C communication protocol are described at FIGS. 3 through 5 with reference to FIG. 2.

FIG. 3 illustrates an example block diagram 300 in accordance with aspects of the present disclosure. The block diagram 300 may implement aspects of the system 100 and system 200 described with reference to FIGS. 1 and 2.

In an example, the block diagram 300 may be implemented by a controller device 205 and one or more target devices 210 described with reference to FIG. 2. For example, the block diagram 300 may be implemented by electronic circuitry included in the controller device 205 and electronic circuitry included in the one or more target devices 210.

Operations described with reference to block diagram 300 may be performed in a different order than the orders described herein, the operations may be performed in different orders or at different times, certain operations may be omitted, or other operations may be added.

At 305, the controller device 205 may transmit a transaction command (a new transaction command) over the communication bus 215 to a target device 210. The transaction command may include a slave address (also referred to herein as a "slave_addr"). The transaction command may be, for example, a write command or a read command.

Non-Limiting Example—Message Protocol Using I2C or I3C

A non-limiting example will be described herein in with reference to 310, 315, 320-a, 320-b, and 325. The transaction command may include a slave address (also referred to herein as 'I2C_slave_addr'). Based on the slave address, the target device 210 may identify a communication protocol associated with the transaction command.

For example, at 310, the target device 210 may identify that the transaction command includes a slave address "0x47." The target device 210 may compare the slave address "0x47" to a default slave address (e.g., "0x48"). For example, the target device 210 may determine whether the slave address "0x47" matches the default slave address of "0x48." In some aspects, the terms "default slave address" and "base slave address" may be used interchangeably herein. The slave address "0x47" and the default slave address "0x48" are examples, and it is to be understood that aspects of the present disclosure support using device addresses as the slave address included in the transaction command 305 and/or the default slave address.

In an example, for an ASIC (e.g., System on Chip (SOC), input pins to the ASIC are sampled. In some aspects, different values are respectively provided to different devices on a PCB by a PCB designer. The system 100 may support a strapping mechanism that supports multiple use of each input pin. For example, at reset, the HW may latch a value for an input pin (e.g., set the value using an external pull up or pulldown resistor). In some other operations (e.g., at normal operation), the system 100 may drive the value for the input pin by some ASIC on the PCB, thereby overriding the values set by the resistors. The terms "input pins" and "strap pins" may be used interchangeably herein.

In response to a comparison result in which the target device 210 determines the slave address "0x47" does not match the default slave address "0x48" (e.g., 'No'), the target device 210 may proceed to 315. For example, based on the comparison result (e.g., 'No') at 310, the target device 210 may proceed to 315, at which the target device 210 may identify that a message protocol (also referred to herein as a message interface) is to be used for communication and/or data transfer between the target device 210 and the controller device 205. Further at 315, the target device 210 may compare the slave address "0x47" to a set of slave addresses 122 included in the address table 120. For example, the target device 210 may identify whether the slave address "0x47" is included in the slave addresses 122.

The slave addresses 122 may be referred to as "Device_addr" in the address table 120. For each of the slave addresses 122, the address table 120 may include a matching bit 123 (e.g., "Match 1 bit") and an I2C/I3C bit 124 (e.g., "I2C/I3C 1 bit"). Accordingly, for example, each table entry 121 (e.g., table entry 121-a through table entry 121-n) may include a slave address 122, a matching bit 123, and an I2C/I3C bit 124. In some examples, the table 120 is a content addressable memory (CAM).

Each matching bit 123 may be a single bit having a value for validating or invalidating an entry (a row) in the address table 120. For example, if table entry 121-a (e.g., row 121-a) is valid, the match bit is set to 1. In another example, if table entry 121-b (e.g., row 121-b) is invalid, the match bit is set to 0. Each I2C/I3C bit 124 may be a single bit having a value (e.g., '0' or '1') that indicates whether I2C communication protocol or I3C communication protocol is to be used for communication and/or data transfer between the target device 210 and the controller device 205. In a non-limiting example, a value of '0' may indicate that I2C communication protocol is to be used, and a value of '1' may indicate that I3C communication protocol is to be used.

In some cases, based on a result of comparing the slave address "0x47" to the slave addresses 122 included in the address table 120, the target device 210 may determine whether to respond to or ignore the transaction command. For example, if the target device 210 determines the slave address "0x47" matches a slave address 122 included in table entry 121-a (e.g., the target device 210 determines the slave address "0x47" is included in table entry 121-a), the target device 210 may further identify the value of an I2C/I3C bit 124 that is included in the same table entry 121-a. Based on the value of the I2C/I3C bit 124, the target device 210 may identify whether to use the I2C communication protocol (e.g., if the value of the I2C/I3C bit 124 is '0') or the I3C communication protocol (e.g., if the value of the I2C/I3C bit 124 is '1') in association with the transaction command.

At 320-a, the target device 210 may provide the controller device 205 access to a built-in memory (e.g., a FIFO memory buffer (also referred to herein as "I2C_FIFO memory," "I2C_FIFO," a "FIFO memory," or a "buffer") of the target device 210. For example, the slave address "0x47" may correspond to the memory, and the target device 210 may transfer the data to or from the memory in association with the transaction command using the I2C communication protocol (e.g., if the value of the I2C/I3C bit 124 is '0') or the I3C communication protocol (e.g., if the value of the I2C/I3C bit 124 is '1'). Transferring the data may include writing data to the memory. In another example, transferring the data may include providing the data from the memory to the controller device 205.

In some examples, the target device 210 may be a generic device. For example, the target device 210 may be a memory device (e.g., an EEPROM as described with reference to memory device 150). In another example, the target device 210 may be an LCD driver 155 or a sensor device (e.g., temperature sensor 165) as described with reference to FIG. 1. For example, regardless of the type of the target device 210, the target device 210 may include a memory (e.g., a relatively small memory). For example, each of the LCD driver 155 and the temperature sensor 165 may include a memory.

At 325, the block diagram 300 may include message parsing by firmware. For example, at 325, the target device 210 (e.g., firmware at the target device 210) may parse the FIFO memory buffer in association with writing data to or reading data from the FIFO memory buffer. For example, 325 may include message parsing in association with transferring data to or from the FIFO memory buffer. The message protocol using I2C or I3C as described herein may include writing the entirety of a message to (or reading the entirety of a message from) the FIFO memory buffer. In an example, the message may be a platform level data model (PLDM) over management component transport protocol (MCTP) message over I2C (SMBus). In another example, the message may be a PLDM over MCTP message over I3C.

In some alternative and/or additional aspects, if at 315 the target device 210 determines the slave address "0x47" fails to match a slave address 122 included in the table entries 121 (e.g., the target device 210 determines the slave address "0x47" is not included in any of the table entries 121), the target device 210 may proceed to 320-b and ignore the transaction command. For example, based on the failure to match the slave address "0x47" to a slave address 122 included in the table entries 121, the target device 210 may identify that the transaction command is not for the target device 210.

In some alternative and/or additional aspects, the transaction command received at 305 may be a dummy command. In an example, the dummy command may be directed to the memory (I2C_FIFO) of the target device 210, and when the dummy command is parsed by firmware, the dummy command indicates "null." That is, for example, a message payload of the dummy command may include a null command. Accordingly, for example, in response to receiving the dummy command, the target device 210 may identify that the controller device 205 is to communicate using the I3C communication protocol. In some examples, the target device 210 may transition to an I3C mode described herein.

Non-Limiting Example—Register Access Protocol Using I2C

A non-limiting example in which the transaction command includes a slave address "0x48" will be described herein with reference to 310 and 330.

At 310, the target device 210 may identify that the transaction command includes a slave address "0x48." The target device 210 may compare the slave address "0x48" to the default slave address (e.g., "0x48") described herein. For example, the target device 210 may determine whether the slave address "0x48" matches the default slave address of "0x48."

In response to a comparison result in which the target device 210 determines the slave address "0x48" does match the default slave address "0x48" (e.g., 'Yes'), the target device 210 may identify that a register access protocol (also referred to herein as "direct register access") is to be used for communication and/or data transfer between the target device 210 and the controller device 205. The register access protocol may be, for example, a bus protocol. For example, the register access protocol may include aspects of the SMBus protocols as described at chapter 6.5 of System Management Bus (SMBus) Specification, Version 3.1, 19 Mar. 2018, System Management Interface Forum, Inc., aspects of which are incorporated herein. Further, based on the comparison result (e.g., 'Yes') at 310, the target device 210 may identify that I2C communication protocol is to be used in association with the transaction command.

At 330, the target device 210 may identify a hardware register corresponding to the slave address "0x48." In some aspects, at 330, the target device 210 may provide the controller device 205 access to the hardware register. For example, the target device 210 may transfer data to or from the hardware register in association with the transaction command using the register access protocol and the I2C communication protocol. Transferring the data may include writing data to the hardware register. In another example, transferring the data may include providing the data from the hardware register to the controller device 205.

With reference to examples of the block diagram 300, aspects of the present disclosure support the capability of the controller device 205 and the target device 210 to transition between using the I3C communication protocol and the I2C communication protocol in association with a transaction command, without a priory agreement on the state of I2C or I3C communications. For example, based on the comparison features at 310, the target device 210 may use a messaging interface (e.g., as described with reference to 315) or a direct register access (e.g., as described with reference to 330) in association with the transaction command. Further, for example, by referencing the slave address included in the transaction command against the slave addresses 122 included in the address table 120, the target device 210 may identify whether to use a I2C communication protocol or I3C communication protocol for the messaging interface (e.g., as described with reference to 320-a and 325) or ignore the transaction command (e.g., as described with reference to 320-b).

In some aspects, due to the ability of clock stretching in I2C, aspects of the present disclosure include using I2C rather than using I3C for some implementations (e.g., for direct register access described herein). For example, clock stretching is not supported by I3C. Clock stretching allows a slave device (e.g., target device 210) to hold the clock until the slave device receives a response to a read attempt, which is beneficial for direct register access reading.

Non-Limiting Examples—Determination of the Communication Protocol

Example aspects of the controller device 205 determining or setting a communication protocol associated with exchanging data over the communication bus 215 are described herein.

In an example, the controller device 205 may set the I3C communication protocol as the communication protocol to achieve a target performance threshold. An example of the performance threshold includes a power savings threshold. In another example, the controller device 205 may set the I3C communication protocol as the communication protocol if the controller device 205 has "nothing to say" (e.g., in the absence of any data to be transferred to or from the target device 210). As described herein, using I3C communication protocol provides benefits of using In-Band Interrupts without an additional interrupt wire.

In some aspects, the controller device 205 may select the I2C communication protocol (and direct register access protocol) to address an error associated with a previous attempt to read data from (or write data to) a target device 210 using the I3C communication protocol. That is, for example, the controller device 205 may set the I2C communication protocol for direct hardware writing and/or reading in association with the target device 210 for a case in which the target device 210 was working in I3C mode, but stuck firmware at the target device 210 prevented successful writing and/or reading.

In some other aspects, the controller device 205 may select the I2C communication protocol (and direct register access protocol) based on a security parameter associated with requesting data from a target device 210. For example, the controller device 205 may use the I2C communication protocol (and direct register access protocol) for operations that request a device identifier of the target device 210.

Accordingly, for example, the controller device 205 may use a transaction command to indicate, to a target device 210, whether to use the I3C communication protocol or I2C communication protocol as a messaging protocol (e.g., as described with reference to 310, 315, 320-a, and 325), whether to transition to the I3C communication protocol but ignore the transaction command (e.g., as described with reference to 320-b), or whether to use the I2C communication protocol as a direct register access protocol (e.g., as described with reference to 310 and 325).

Accordingly, for example, aspects of the present disclosure support I2C for bus protocol, I2C for messages (e.g., as identified by using the address table 120), and I3C for messages (e.g., as identified by using the address table 120).

FIG. 4 illustrates an example of a process flow 400 in accordance with aspects of the present disclosure. In some examples, process flow 400 may implement aspects of a target device (e.g., target device 110, target device 210, etc.) described with reference to FIGS. 1 through 3.

In the following description of the process flow 400, the operations may be performed in a different order than the order shown, or the operations may be performed in different orders or at different times. Certain operations may also be left out of the process flow 400, or other operations may be added to the process flow 400.

It is to be understood that any target device described herein may perform the operations shown.

At 405, the process flow 400 may include receiving a transaction command including a slave address. In some examples, the transaction command includes a write transaction or a read transaction.

At 410, the process flow 400 may include determining, based on the slave address, a communication protocol associated with transferring data in association with the transaction command over a communication bus.

In some examples, the first communication protocol includes a message protocol, wherein the message protocol is associated with an I2C communication protocol or an I3C communication protocol. In some other examples, the second communication protocol includes a bus protocol, wherein the bus protocol is associated with the I2C communication protocol.

In some aspects, the transaction command (received at 405) further includes: a first indication of a message interface (also referred to herein as a firmware interface) associated with the slave address; or a second indication of direct register access associated with the slave address. In an example, determining the communication protocol may include identifying the first communication protocol (e.g., message protocol, I2C or I3C) as the communication protocol in response to the transaction command comprising the first indication. In another example, determining the communication protocol may include identifying the second communication protocol (e.g., bus protocol, I2C) as the communication protocol in response to the transaction command comprising the second indication.

In some aspects, determining the communication protocol includes comparing (at 412) the slave address to a second slave address. Determining the communication protocol may include identifying the first communication protocol as the communication protocol or identifying the second communication protocol as the communication protocol based on a result of comparing the slave address to the second slave address.

In an example, in response to a comparison result in which the slave address matches the second slave address (e.g., slave address=0x48), determining the communication protocol may include identifying (at 414-a) the second communication protocol (e.g., bus protocol, I2C) as the communication protocol. At 416-a, the process flow 400 may include identifying a hardware register corresponding to the slave address.

In another example, in response to a comparison result in which the slave address fails to match the second slave address (e.g., slave address is different from 0x48), determining the communication protocol may include identifying (at 414-b) the first communication protocol (e.g., message protocol, I2C or I3C) as the communication protocol and comparing (at 415) the slave address to a set of slave addresses included in an address table.

In some aspects, the set of slave addresses may include one or more slave addresses associated with the I2C communication protocol, one or more second slave addresses associated with the I3C communication protocol, or a combination thereof. In some aspects, the address table is compatible with identifying one or more target devices in association with: using the first communication protocol in association with an I3C communication protocol and the one or more target devices; using the first communication protocol in association with an I2C communication protocol and the one or more target devices; and using the second communication protocol in association with the I2C communication protocol and the one or more target devices.

At 416-b, the process flow 400 may include identifying a memory corresponding to the slave address, based on comparing (at 415) the slave address to the set of slave addresses included in the address table (e.g., in response to a comparison result that identifies the slave address is present in the set of slave addresses). In some aspects, the memory is of a device. Additionally, or alternatively, the process flow 400 may include ignoring (at 418) the transaction command based on comparing (at 415) the slave address to the set of slave addresses included in the address table (e.g., in response to a comparison result that identifies the slave address is absent from the set of slave addresses).

At 420, the process flow 400 may include transferring the data in association with the transaction command based on the communication protocol. For example, at 420-a, the process flow 400 may include transferring the data to or from the hardware register in association with the transaction command, using the second communication protocol (e.g., bus protocol), wherein the second communication protocol includes the I2C communication protocol. In some aspects, transferring the data to the hardware register may include writing the data to the hardware register.

In another example, at 420-b, the process flow 400 may include transferring the data to or from the memory of the device in association with the transaction command, using the first communication protocol (e.g., message protocol), wherein the first communication protocol includes the I2C communication protocol or the I3C communication protocol. In some aspects, transferring the data to the device may include writing the data to the memory of the device, and transferring the data from the device may include reading the data from the memory of the device.

At 425, the process flow 400 may include receiving a second transaction command, wherein the second transaction command is a dummy command. In an example, a message payload of the dummy command includes a null command.

At 430, the process flow 400 may include identifying, as the communication protocol, an I3C communication protocol in response to receiving the second transaction command.

FIG. 5 illustrates an example of a process flow 500 in accordance with aspects of the present disclosure. In some examples, process flow 500 may implement aspects of a controller device (e.g., MCU 105, controller device 205, etc.) described with reference to FIGS. 1 through 3.

In the following description of the process flow 500, the operations may be performed in a different order than the order shown, or the operations may be performed in different orders or at different times. Certain operations may also be left out of the process flow 500, or other operations may be added to the process flow 500.

It is to be understood that any controller device (e.g., an MCU 105, a controller device 205, etc.) described herein may perform the operations shown.

At 505, the process flow 500 may include determining a communication protocol associated with exchanging data over a communication bus.

In some aspects, determining the communication protocol at 505 may include setting an I2C communication protocol or an I3C communication protocol as the communication protocol, wherein the communication protocol includes a message protocol. In an example, determining the communication protocol at 505 includes setting the I3C communication protocol as the communication protocol based on one or more criteria. In an example, the one or more criteria includes at least one of: a target performance threshold; and an absence or presence of the data to be exchanged with the target device.

In some other aspects, determining the communication protocol at 505 may include setting the I2C communication protocol as the communication protocol based on one or more criteria, wherein the communication protocol includes a bus protocol. In an example, the one or more criteria includes at least one of: an error associated with reading the data using a previous communication protocol; a security parameter associated with requesting the data; and a target use of the bus protocol in association with reading registers of the target device.

At 510, the process flow 500 may include selecting a slave address from a set of slave addresses included in an address table in response to setting the I2C communication protocol or the I3C communication protocol as the communication protocol. In some aspects, the address table is compatible with identifying one or more target devices in association with using the I2C communication protocol and the I3C communication protocol.

At 515, the process flow 500 may include generating, in response to determining the communication protocol, a transaction command including the slave address.

At 520, the process flow 500 may include transmitting the transaction command.

At 525, the process flow 500 may include exchanging the data with a target device corresponding to the slave address using the communication protocol, based on transmitting the transaction command.

In some aspects, at 530, the process flow 500 may include transmitting a second transaction command in response to setting the I3C communication protocol as the communication protocol (e.g., in response to an absence or presence of the data to be transferred to or from the target device). In an example, the second transaction command may be a dummy command.

Aspects of the present disclosure as described herein at least with reference to FIGS. 1 through 5 support a system including: a communication bus; a controller device; and a target device.

The controller device and the target device may transition between using a first communication protocol comprising a message protocol and a second communication protocol comprising a bus protocol in association with transferring data over the communication bus based on a transaction command generated by the controller device.

In some aspects, the controller device and the target device may transition between using the first communication protocol and the second communication protocol without: a reset protocol between the controller device and the target device; a handshake protocol between the controller device and the target device; a waiting period between using the first communication protocol and the second communication protocol; or an indication of the first communication protocol or the second communication protocol.

In some aspects, based on the transaction command, the controller device and the target device transition between: using an I2C communication protocol in association with the first communication protocol; using an I3C communication protocol in association with the first communication protocol; and using the I2C communication protocol in association with the second communication protocol.

In some aspects, based on a slave address included in the transaction command, the target device may use the first communication protocol or the second communication protocol in association with transferring the data over the communication bus.

In some aspects, the system may include an address register including a set of slave addresses. The target device, based on a result of comparing the slave address included in the transaction command to the set of slave addresses, may: transfer the data over the communication bus to or from a memory of a device, wherein the device is associated with the slave address; or ignore the transaction command.

In some aspects, the I3C communication protocol is associated with a default mode of the controller device and a default mode of the target device.

Figure 6:
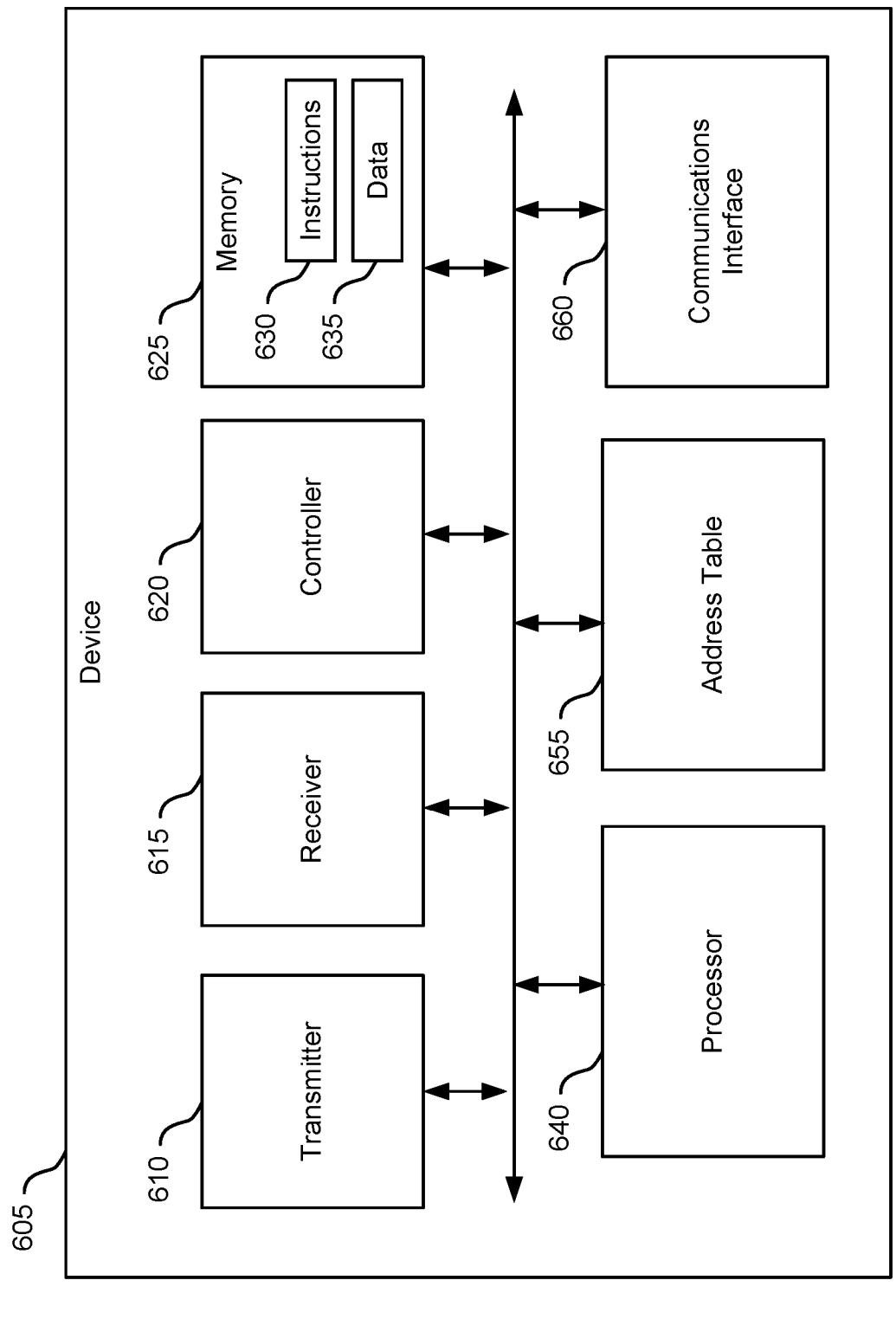
FIG. 6 illustrates an example of a system in accordance with aspects of the present disclosure.

FIG. 6 illustrates an example of a system that supports hot transition between I2C and I3C in accordance with aspects of the present disclosure. The system 600 may include a device 605. The device 605 may include aspects of any of the devices (e.g., a controller device, a target device, etc.) described with reference to FIGS. 1 and 2. In some cases, the device 605 may be referred to as a computing resource. The device 605 may perform any or all of the operations described in the present disclosure.

The device 605 may include a transmitter 610, a receiver 615, a controller 620, a memory 625, a processor 640, an address table 655, and a communications interface 660. In some examples, components of the device 605 (e.g., transmitter 610, receiver 615, controller 620, memory 625, processor 640, address table 655, communications interface 660, etc.) may communicate over a system bus (e.g., control busses, address busses, data busses, etc.) included in the device 605. In some aspects, any of the components of the device may be integrated in or separate from the device 605. The data busses of the system bus may include example aspects of a communication bus 115 described herein.

The transmitter 610 and the receiver 615 may support the transmission and reception of signals to and from the device 605. In some aspects, the transmitter 610 and the receiver 615 may support the transmission and reception of signals within the device 605. The transmitter 610 and receiver 615 may be collectively referred to as a transceiver. An antenna may be electrically coupled to the transceiver. The device 605 may also include (not shown) multiple transmitters 610, multiple receivers 615, multiple transceivers and/or multiple antennas.

The controller 620 may be located on a same chip (e.g., ASIC chip) as the transmitter 610 and/or the receiver 615. In some cases, the controller 620 may be located on a different chip as the transmitter 610 and/or the receiver 615. In some examples, the controller 620 may be located on a chip of or on a chip of another device 605. In some examples, the controller 620 may be a programmed microprocessor or microcontroller. In some aspects, the controller 620 may include one or more CPUs, memory, and programmable I/O peripherals.

The memory 625 may be any electronic component capable of storing electronic information. The memory 625 may be, for example, random access memory (RAM), read-only memory (ROM), FIFO memory, magnetic disk storage media, optical storage media, flash memory devices in RAM, on-board memory included with the processor, EPROM memory, EEPROM memory, registers, and so forth, including combinations thereof.

The memory 625 may include instructions 630 (computer readable code) and data 635 stored thereon. The instructions 630 may be executable by the processor 640 to implement the methods disclosed herein. In some aspects, execution of the instructions 630 may involve one or more portions of the data 650. In some examples, when the processor 640 executes the instructions 630, various portions of the instructions 630 and/or the data 635 may be loaded onto the processor 640.

The processor 640 may correspond to one or multiple computer processing devices. For example, the processor 640 may include a silicon chip, such as a Field Programmable Gate Array (FPGA), an ASIC, any other type of Integrated Circuit (IC) chip, a collection of IC chips, or the like. In some aspects, the processors may include a microprocessor, a Central Processing Unit (CPU), a Graphics Processing Unit (GPU), or plurality of microprocessors configured to execute instructions sets stored in a corresponding memory (e.g., memory 625 of the device 605). For example, upon executing the instruction sets stored in memory 625, the processor 640 may enable or perform one or more functions of the device 605. In some examples, a combination of processors 640 (e.g., an advanced reduced instruction set computer (RISC) machine (ARM) may be implemented in the device 605.

The communications interface 660 may support interactions (e.g., via a physical or virtual interface) between a user and the device 605.

Any of the steps, functions, and operations discussed herein can be performed continuously and automatically.

The exemplary apparatuses, systems, and methods of this disclosure have been described in relation to examples of a system 100, a system 200, a controller device, and a target device. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

It will be appreciated from the descriptions herein, and for reasons of computational efficiency, that the components of devices and systems described herein can be arranged at any appropriate location within a distributed network of components without impacting the operation of the device and/or system.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

While the flowcharts have been discussed and illustrated in relation to a particular sequence of events, it should be appreciated that changes, additions, and omissions to this sequence can occur without materially affecting the operation of the disclosed examples, configuration, and aspects.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more examples, configurations, or aspects for the purpose of streamlining the disclosure. The features of the examples, configurations, or aspects of the disclosure may be combined in alternate examples, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed example, configuration, or aspect. Thus, the following claims are hereby incorporated into this Detailed Description, with each claim standing on its own as a separate preferred example of the disclosure.

In at least one example, architecture and/or functionality of various previous figures are implemented in context of a general computer system, a circuit board system, a game console system dedicated for entertainment purposes, an application-specific system, and more. In at least one example, the computer system may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

Other variations are within spirit of present disclosure. Thus, while disclosed techniques are susceptible to various modifications and alternative constructions, certain illustrated examples thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed examples (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one example, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain examples require at least one of A, at least one of B and at least one of C each to be present. In addition, unless otherwise noted or contradicted by context, term "plurality" indicates a state of being plural (e.g., "a plurality of items" indicates multiple items). In at least one example, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one example, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one example, code is stored on a computer-readable storage medium, for example, in form of a computer program comprising a plurality of instructions executable by one or more processors. In at least one example, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one example, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one example, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one example, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one example, different components of a computer system have separate processors and different processors execute different subsets of instructions.

Accordingly, in at least one example, computer systems are configured to implement one or more services that singly or collectively perform operations of processes described herein and such computer systems are configured with applicable hardware and/or software that enable performance of operations. Further, a computer system that implements at least one example of present disclosure is a single device and, in another example, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate examples of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one example, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one example, process of obtaining, acquiring, receiving, or inputting analog and digital data can be accomplished in a variety of ways such as by receiving data as a parameter of a function call or a call to an application programming interface. In at least one example, processes of obtaining, acquiring, receiving, or inputting analog or digital data can be accomplished by transferring data via a serial or parallel interface. In at least one example, processes of obtaining, acquiring, receiving, or inputting analog or digital data can be accomplished by transferring data via a computer network from providing entity to acquiring entity. In at least one example, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An apparatus comprising:
   electronic circuitry,
   wherein the electronic circuitry is to:
   receive, from a controller device, a transaction command comprising a slave address;
   compare the slave address to a set of slave addresses in an address table, wherein the address table contains an indication of whether each slave address in the set of slave addresses is matched with either a first communication protocol or a second communication protocol;
   determine, based on the comparison, a selected communication protocol for responding to the transaction command over a communication bus;
   generate data associated with the transaction command; and
   send the data to the controller device over the communication bus using the selected communication protocol.

2. The apparatus of claim 1, wherein the set of slave addresses includes multiple slave addresses.

3. The apparatus of claim 1, wherein:
   the transaction command further comprises:
   a first indication of a message interface associated with the slave address; or
   a second indication of direct register access associated with the slave address; and
   determining the selected communication protocol comprises:
   identifying the first communication protocol as the selected communication protocol in response to the transaction command comprising the first indication; and
   identifying the second communication protocol as the selected communication protocol in response to the transaction command comprising the second indication.

4. The apparatus of claim 1, wherein:
   the first communication protocol comprises a message protocol, wherein the message protocol is associated with an I2C communication protocol or an I3C communication protocol; and
   the second communication protocol comprises a bus protocol, wherein the bus protocol is associated with the I2C communication protocol.

5. The apparatus of claim 1, wherein the set of slave addresses comprise one or more slave addresses associated with an I2C communication protocol, one or more second slave addresses associated with an I3C communication protocol, or a combination thereof, and wherein in response to a comparison result in which the slave address fails to match a second slave address in the set of slave addresses, the electronic circuitry is to:
   identify a memory corresponding to the slave address, based on comparing the slave address to the set of slave addresses comprised in the address table, wherein the memory is of a device; and
   transfer the data to or from the memory of the device in association with the transaction command, using the first communication protocol as the selected communication protocol, wherein the first communication protocol comprises the I2C communication protocol or the I3C communication protocol.

6. The apparatus of claim 1, wherein in response to a comparison result in which the slave address matches a second slave address in the set of slave addresses, the electronic circuitry is to:
identify a hardware register corresponding to the slave address; and
transfer the data to or from the hardware register in association with the transaction command, using the second communication protocol as the selected communication protocol, wherein the second communication protocol comprises an I2C communication protocol.

7. The apparatus of claim 1, wherein in response to a comparison result in which the slave address fails to match a second slave address in the set of slave addresses, the electronic circuitry is to:
ignore the transaction command.

8. The apparatus of claim 1, wherein the electronic circuitry is to:
receive a second transaction command, wherein the second transaction command is a dummy command, wherein a message payload of the dummy command comprises a null command; and
identify, as the selected communication protocol, an I3C communication protocol in response to receiving the second transaction command.

9. An apparatus comprising:
electronic circuitry,
wherein the electronic circuitry is to:
determine a communication protocol for communicating with a target device as either a first communication protocol or a second communication protocol;
select, based on the determined communication protocol, a slave address that identifies the target device, from among a plurality of target devices, and which the target device uses to determine to respond to a transaction command according to the determined communication protocol, wherein the slave address is selected from a set of slave addresses in an address table that contains an indication of whether each slave address in the set of slave addresses is matched with either the first communication protocol or the second communication protocol; determine
generate the transaction command comprising the slave address; and
send the transaction command to the target device.

10. The apparatus of claim 9, wherein determining the communication protocol comprises:
setting an I3C communication protocol as the communication protocol based on one or more criteria, wherein the one or more criteria comprises at least one of:
a target performance threshold; and
an absence or presence of data to be exchanged with the target device.

11. The apparatus of claim 9, wherein determining the communication protocol comprises setting an I2C communication protocol as the communication protocol based on one or more criteria, wherein the communication protocol comprises a bus protocol, and wherein the one or more criteria comprises at least one of:
an error associated with reading data using a previous communication protocol;
a security parameter associated with requesting the data; and
a target use of the bus protocol in association with reading registers of the target device.

12. The apparatus of claim 9, wherein:
determining the communication protocol comprises setting an I2C communication protocol or an I3C communication protocol as the communication protocol, wherein the communication protocol comprises a message protocol; and
the electronic circuitry is to select the slave address in response to setting the I2C communication protocol or the I3C communication protocol as the communication protocol.

13. The apparatus of claim 9, wherein:
determining the communication protocol comprises setting an I3C communication protocol as the communication protocol; and
the electronic circuitry is to transmit a second transaction command in response to setting the I3C communication protocol as the communication protocol, wherein the second transaction command is a dummy command.

14. A system comprising:
a communication bus;
a controller device to generate a transaction command comprising a slave address; and
a target device,
wherein the controller device and the target device transition between using a first communication protocol comprising a message protocol and a second communication protocol comprising a bus protocol to communicate over the communication bus,
wherein the target device is to:
compare the slave address to a set of slave addresses in an address table that contains an indication of whether each slave address in the set of slave addresses is matched with either the first communication protocol or the second communication protocol;
determine, based on the comparison, a selected communication protocol for responding to the transaction command as either the first communication protocol or the second communication protocol;
generate data associated with the transaction command; and
send the data to the controller device over the communication bus using the selected communication protocol.

15. The system of claim 14, wherein the controller device and the target device transition between using the first communication protocol and the second communication protocol without:
a reset protocol between the controller device and the target device;
a handshake protocol between the controller device and the target device;
a waiting period between using the first communication protocol and the second communication protocol; or
an indication of the first communication protocol or the second communication protocol.

16. The system of claim 14, wherein, based on the transaction command, the controller device and the target device transition between:
using an I2C communication protocol in association with the first communication protocol;
using an I3C communication protocol in association with the first communication protocol; and
using the I2C communication protocol in association with the second communication protocol.

17. The system of claim 14, wherein the target device, based at least in part on a result of the comparison:
   transfers the data over the communication bus to or from a memory of a device, wherein the device is associated with the slave address.

18. A method comprising:
   receiving, from a controller device, a transaction command comprising a slave address;
   comparing the slave address to a set of slave addresses in an address table that contains an indication of whether each slave address in the set of slave addresses is matched with either a first communication protocol or a second communication protocol;
   determining, based on the comparison, a selected communication protocol for responding to the transaction command over a communication bus;
   retrieving data associated with the transaction command; and
   transferring the data to the controller device using the selected communication protocol.

19. The method of claim 18, wherein the set of slave addresses includes multiple slave addresses.

20. A method comprising:
   determining a communication protocol for communicating with a target device as either a first communication protocol or a second communication protocol;
   selecting, based on the determined communication protocol, a slave address that identifies the target device, from among a plurality of target devices, and which the target device uses to determine to respond to a transaction command according to the determined communication protocol, wherein the slave address is selected from a set of slave addresses in an address table that contains an indication of whether each slave address in the set of slave addresses is matched with either the first communication protocol or the second communication protocol;
   generating the transaction command comprising the slave address; and
   sending the transaction command to the target device.

21. The method of claim 20, wherein determining the communication protocol comprises:
   setting an I3C communication protocol as the communication protocol based on one or more criteria, wherein the one or more criteria comprises at least one of:
      a target performance threshold; and
      an absence or presence of data to be exchanged with the target device.

* * * * *